United States Patent [19]

Cataldo

[11] 4,069,803
[45] Jan. 24, 1978

[54] SYNCHRONIZING AND INDEXING CLUTCH

[75] Inventor: Roy S. Cataldo, Birmingham, Mich.

[73] Assignee: General Motors Corporation, Detroit, Mich.

[21] Appl. No.: 759,996

[22] Filed: Jan. 17, 1977

[51] Int. Cl.$^2$ .............................................. F02B 75/18
[52] U.S. Cl. ............................. 123/198 F; 192/53 B; 192/85 A; 74/595
[58] Field of Search ............... 123/198 F, 179 E; 192/53 B, 85 A; 74/595

[56] References Cited

U.S. PATENT DOCUMENTS

| | | | |
|---|---|---|---|
| 2,393,398 | 1/1946 | Nabstedt | 192/53 B |
| 3,161,270 | 12/1964 | Aschauer | 192/53 B |
| 3,204,731 | 9/1965 | Bent | 192/67 |

FOREIGN PATENT DOCUMENTS

| | | | |
|---|---|---|---|
| 879,436 | 10/1961 | United Kingdom | 192/53 B |
| 1,421,172 | 1/1976 | United Kingdom | 123/179 E |

*Primary Examiner*—Alan Cohan
*Attorney, Agent, or Firm*—John P. Moran

[57] ABSTRACT

A synchronizing and indexing clutch for connecting adjacent portions of a split engine crankshaft at will, such that one or more engine pistons may be selectively rendered inoperative for low engine power operation, the clutch including input and output members formed on the adjacent ends of the split crankshaft, an annular piston including inner and outer ring members interconnected by a detent mechanism and slidably mounted on the input member, a source of fluid under pressure for actuating the piston, cooperating cone clutch surfaces formed on the output member and the inner piston member, respectively, two sets of ramped indexing teeth formed on the output member and outer piston member, respectively, the two sets of teeth having a predetermined pattern of unequally spaced, variable width teeth and spaces such that engagement of the two sets of teeth will occur only at one particular aligned circumferential position in order to interconnect the split crankshaft portions and thereby bring idle engine pistons into operation in a correct relationship with other continuously working pistons, the cone clutch surfaces serving to synchronize the input and output member's speed prior to the engagement of the two sets of teeth, and the ramped teeth accommodating automatic separation of the two sets of teeth when the pressure on the piston subsides.

4 Claims, 6 Drawing Figures

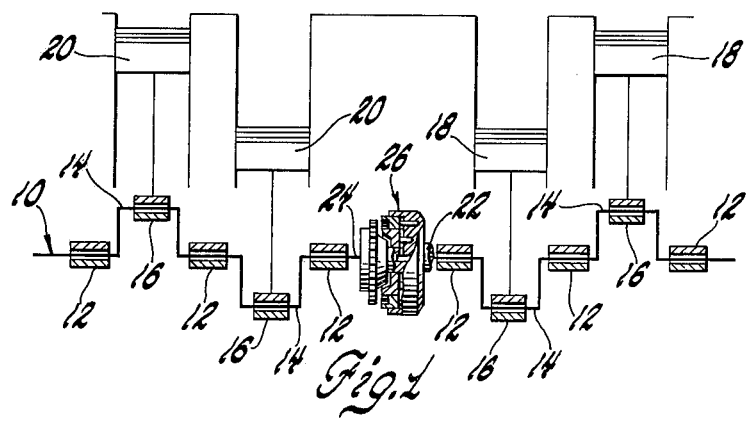
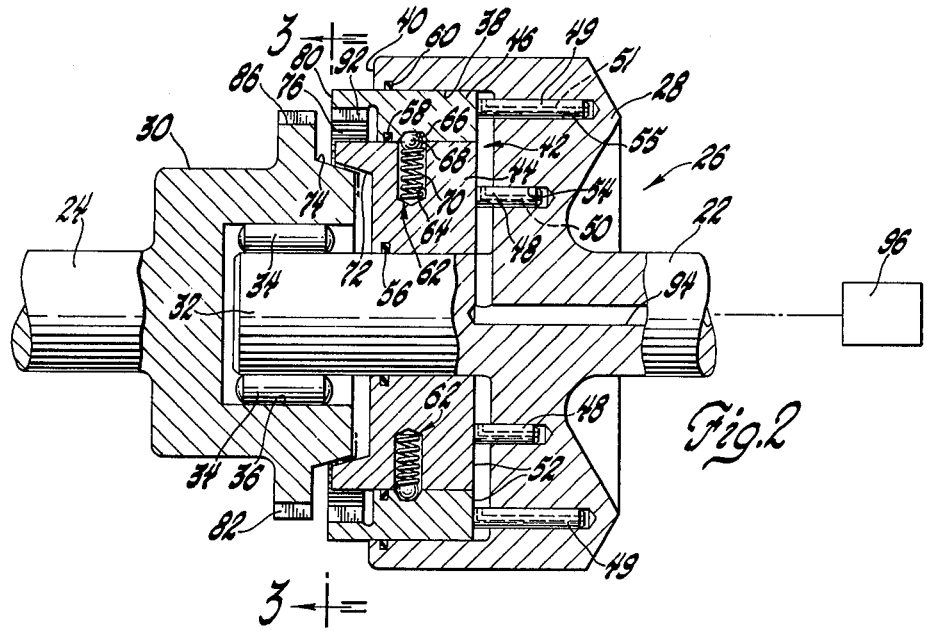
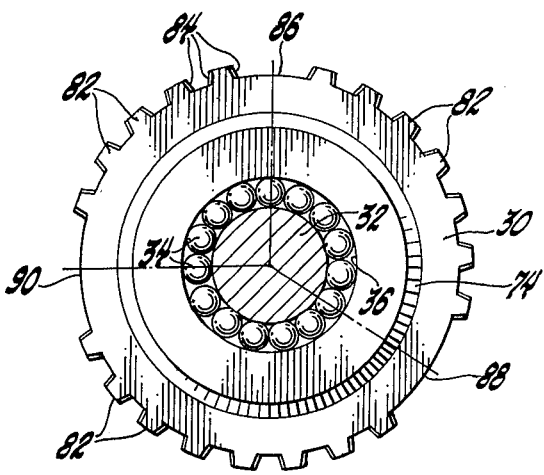

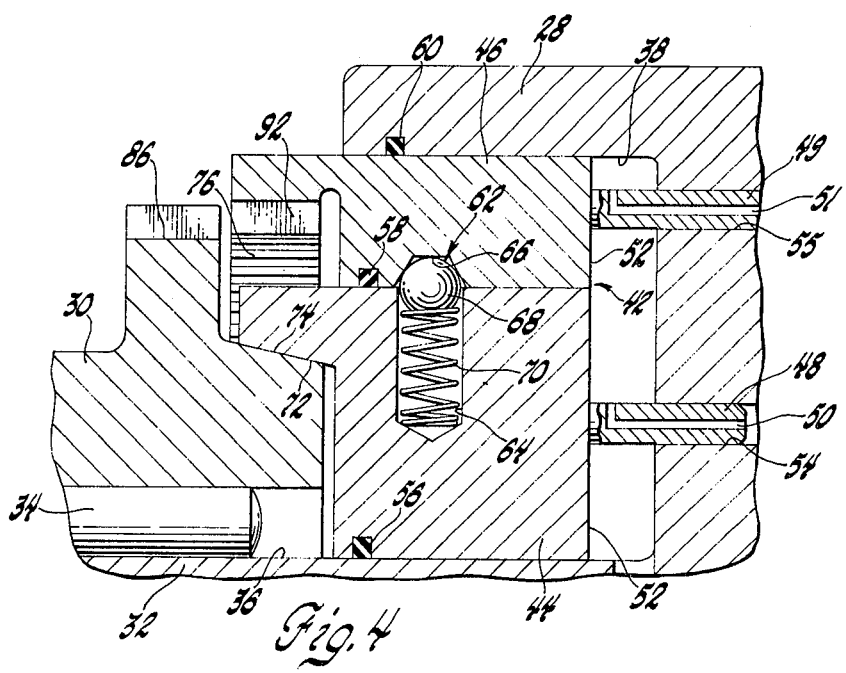
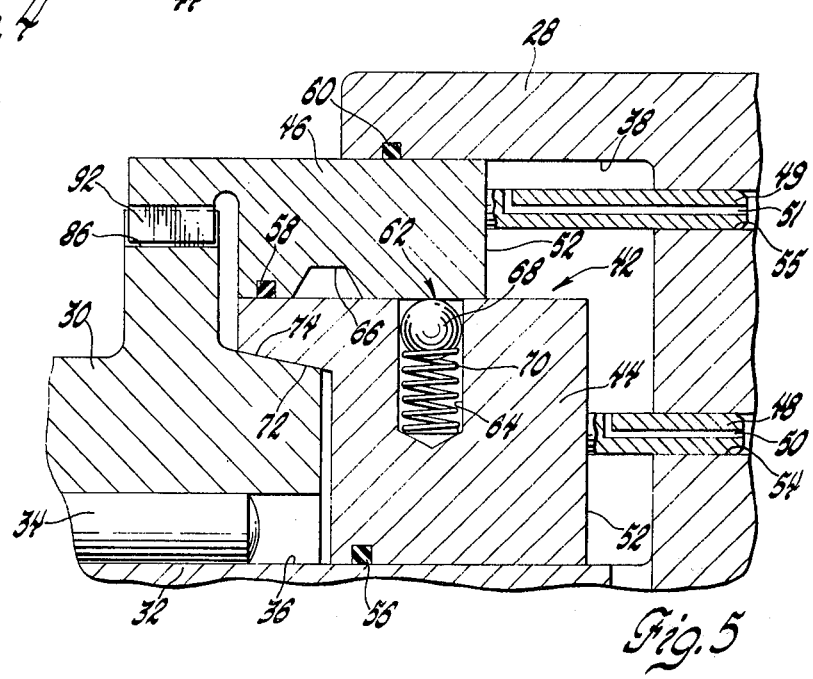
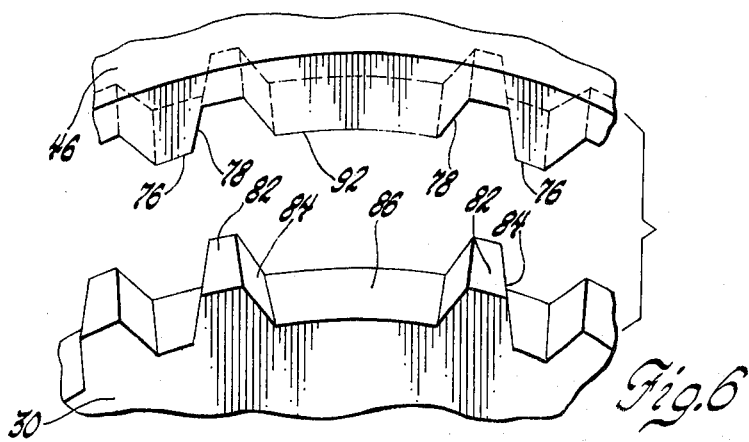

SYNCHRONIZING AND INDEXING CLUTCH

This invention relates generally to positive engaging type clutches, and, more specifically, to a synchronizing and indexing clutch suitable for effecting split engine crankshaft operation whereby the engine may be operated on less than all of its cylinders under light load conditions but in which full engine operation may be effected under full engine load conditions.

Inasmuch as it is known that considerable economics can be realized when resort is made to so-called split engine operation, for example being able to operate an eight cylinder engine on four cylinders, or a four cylinder engine on two cylinders under moderate load conditions, it has heretofore been proposed to provide means for cutting off the supply of gaseous fuel to some of the cylinders of a multi-cylinder engine at a given part load condition in order that the remaining cylinders may work at full load. Under such conditions, the "inactive" pistons are continually "floating" in the system.

Additionally, inasmuch as some of the benefits to be gained by four cylinder operation have been lost due to the fact that some work is being continuously performed in pumping air in the unloaded cylinders of the engine, valve control mechanisms have been suggested for controlling the operation or non-operation of the valves for preselected cylinders of an engine of the over head valve type.

While the above arrangements for effecting split engine operation are generally beneficial for improved fuel economy, an internal combustion engine having first and second crankshafts, each with one or more pistons journalled thereon, with one of the crankshafts operative under light load conditions, and adapted to the use of clutch means that enables engagement of the two crankshafts to take place under full load conditions, is desirable for providing maximum benefits. British patent specification No. 1,421,172, published on Jan. 14, 1976, advocates the use of a first and second crankshaft and associated pistons, with clutch means for drivingly engaging and synchronizing crankshafts, but limited to an improvement in starting only, without regard to means for disengaging under load. Hence, it is desirable to have a simplified, economical and efficient synchronizing clutch and indexing teeth arrangement for controlling the rotation or non-rotation under load of a portion of a split engine crankshaft and, hence, one or more engine pistons operatively connected thereto.

Accordingly, a general objective of the invention is to provide an improved synchronizing and indexing clutch which selectively interconnects or disconnects the adjacent portions of a split engine crankshaft.

Another object of the invention is to provide an improved synchronizing cone clutch and indexing teeth arrangement for selectively interconnecting adjacent portions of a split engine crankshaft such that idle or inactive pistons associated with one of the split crankshaft portions are brought into operation in phase with working pistons.

A further object of the invention is to provide a synchronizing and indexing clutch for use with a split engine crankshaft having the usual crank throw portions operatively connected to the engines' pistons, and including input and output members, an annular piston comprising dual, concentric ring members circumferentially retained and slidably mounted on the input member a detent mechanism operatively interconnecting the dual ring members, cooperating cone clutch surfaces formed on adjacent portions of the inner ring member and the output member respectively, and two sets of indexing teeth formed on adjacent portions of the outer ring member and the output member, respectively, each set of indexing teeth being formed to include three unequally spaced, variable width teeth and cooperating spaces such that engagement therebetween will occur only in one particular aligned circumferential position.

Still another object of the invention is to provide such a synchronizing and indexing clutch wherein all of the teeth of the two sets of indexing teeth are formed to include a predetermined ramp or wedge angle such that the teeth on the outer ring member will be forced away from the teeth on the output member once the pressure on the annular piston is reduced, thereby deactuating one or more engine pistons under engine partial load conditions.

These and other objects and advantages of the invention will be apparent when reference is made to the following description and accompanying drawings, wherein:

FIG. 1 is a schematic illustration of an engine having a split crankshaft embodying the invention;

FIG. 2 is an enlarged cross-sectional view of the invention clutch mechanism;

FIG. 3 is a cross-sectional view taken along the plane of the line 3—3 of FIG. 2, and looking in the direction of the arrows;

FIGS. 4 and 5 are enlarged fragmentary cross-sectional views of portions of the FIG. 2 structure in different operational positions; and FIG. 6 is a fragmentary exploded view of the indexing means embodied in the invention.

Referring now to the drawings in greater detail, FIG. 1 illustrates a crankshaft 10 rotatably mounted in bearings 12 and having four crank throw portions 14, each having a bearing 16 associated therewith for connection to a piston 18 or 20 of a typical four cylinder engine. The crankshaft 10 is split at the midpoint of the length thereof, with the adjacent shaft end portions 22 and 24 operatively connected by a synchronizing and indexing clutch 26.

Referring now to FIG. 2, the synchronizing and indexing clutch 26 includes an input member 28 formed on the end portion 22 of the crankshaft 10, and an output member 30 formed on the oppositely disposed end portion 24. An axial shaft-like extension 32 is formed on the input member 28 and rotatably mounted in suitable needle bearings 34 in a cavity 36 formed in the output member 30.

An annular recess 38 is formed around a face 40 of the input member 28. An annular control piston 42, comprising inner and outer ring members 44 and 46, respectively, is slidably mounted in the annular recess 38. A plurality of equally spaced pin members 48 and 49, including vent passages 50 and 51, are formed on the inner face 52 of the inner and outer ring members 44 and 46, respectively for slidable cooperation with holes 54 and 55 formed in the bottom of the annular recess 38, causing the ring members 44 and 46 to rotate with the input member 28. Suitable concentric "O" ring seals 56, 58 and 60 are mounted around a wall of the annular recess 32 and the outer peripheral surfaces of the inner and outer ring members 44 and 46.

A detent mechanism 62 includes a plurality of radial pockets 64 formed in the outermost surface of the inner ring member 44, a plurality of depressions 66 formed in the adjacent inner surface of the outer ring member 46 and respectively aligned with the radial pockets 64, and a detent ball 68 urged into each of the depressions 66 by a spring 70 mounted in each of the radial pockets 64. The detent mechanism causes the inner ring member 44 to travel axially with the outer ring member 46 until the inner ring member encounters an axially fixed member, as will be explained, at which time the ball 68 will be forced out of the depression 66, against the force of the spring 70, as the outer ring member 46 continues to travel.

A cone clutch surface 72 is formed on the exposed end surface of the inner ring member 44. A cooperating cone clutch surface 74 is formed on an end portion of the output member 30. A first set of indexing teeth 76, each having a predetermined ramp or wedge angle 78 (FIG. 6), is formed around the outer face 80 of the outer ring member 46. A second set of indexing teeth 82, each having a matching ramp or wedge angle 84 (FIG. 6), is formed around the outer peripheral surface of the output member 30 for selective engagement with the first set of teeth 76 on the outer ring member 46.

As shown in FIG. 3, the set of indexing teeth 82 is formed to include three unequally spaced, variable width spaces 86, 88 and 90. These spaces are each wider than a regular tooth space and may, for example, consist of the width of two conventional spaces plus the width of one missing tooth for space 86, or the width of three conventional spaces plus the widths of two missing teeth for each of the spaces 88 and 90. The unequal circumferential spacing may be such that the arcuate lengths between the centers of the three wider spaces are the equivalent of six and one half teeth between the 86 and 90 centers, eight and one half teeth between the 86 to 88 centers, and 10 teeth between the 88 to 90 centers, respectively. Of course, any suitable pattern of number of wider teeth, and individual widths and arcuate lengths thereof may be selected within the scope of the invention.

It's apparent that, when the other set of indexing teeth 76 is formed to include three matching unequally spaced variable width, wider teeth, such as tooth 92, shown in FIG. 6, which is suitable for meshing with the matching space 86, there is only one aligned circumferential position in which the two sets of teeth will engage.

Suitable conduitry 94 is formed in the input member 28 and the associated crankshaft 10 for communicating fluid under pressure from a suitable source, represented at 96, to the annular recess 38 behind the control piston 42, in response to the selective operation by the vehicle operator of any suitable control means (not shown).

In operation, so long as the cone clutch surfaces 72 and 74 and the two sets of teeth 76 and 82 remain apart, as shown in FIG. 2, the two engine pistons 18 associated with the adjacent crank throw portions 14 will remain inactive. In other words, as discussed above, during idle and low engine load conditions, all the cylinders and pistons of a particular engine are not required to efficiently operate the engine, and, hence, one or more engine pistons may remain inactive.

On the other hand, under full load conditions, it will be essential to utilize all available cylinders and engine pistons. Accordingly, the vehicle operator causes the pressure of the fluid in the annular recess 38 to increase, thereby urging the annular control piston 42 to the left in FIG. 2. The inner and outer ring members 44 and 46 are caused to travel axially together, by virtue of the action of the detent mechanism 62, until the cone clutch surface 72 of the inner ring member comes into slipping engagement with the cone clutch surface 74 on the output member 30, as shown in FIG. 4, serving to bring the output member 30 and, hence, the previously inactive portion of the split crankshaft to a speed approaching the speed of the continuously rotating portion.

While the speed of the output member 30 approaches the speed of the inner ring member 44, the outer ring member 46 continues to be urged leftward in FIG. 4 by the fluid pressure in the annular recess 38, the detent balls 68 being forced out of the depressions 66 and into the pockets 64 against the force of the respective springs 70. Once contact is made by the indexing teeth 76 on the outer ring member 46 against the indexing teeth 82 on the output member 30, engagement therebetween, as shown in FIG. 5, will occur only when the respective unequally spaced, variable width spaces 86, 88 and 90 and matching teeth, such as the tooth 92 and two wider teeth (not shown), are circumferentially aligned, thereby driving the crankshaft end portion 24 and the associated crank throw portions 14 and their respective engine pistons 20 in phase with the crank throw portions 14 and the engine pistons 18 on the continuously rotating input end of the crankshaft 10, so as to produce a predetermined firing order for the engine involved.

When it is desired to once again render the two engine pistons 20 inactive under light load conditions, the fluid pressure in the annular recess 38 is reduced and, due to the respective ramp angles 78 and 84 formed on the two sets of teeth, the first set of teeth 76 will automatically be forced out of engagement with the second set of teeth 82, thereby once again deactuating the two engine pistons 20. The greater the ramp angle, over the locking range of 7°, the greater the assurance that the disengaging force on the teeth 76 will urge the outer ring member 46 far enough away from the teeth 82 to once again pick up the detent balls 68 in the depressions 66 and thereby assist in the automatic separating characteristic of the coned surfaces 72 and 74, once the pressure behind the annular control piston 42 is reduced.

It should be apparent that one or more synchronizing and indexing clutches 26 could be incorporated in conjunction with the crankshafts of six or eight cylinder engines and that a number other than two crank throw portions 14 and associated engine pistons could be controlled by a particular clutch.

While but one embodiment of the invention has been shown and described, other modifications thereof are possible.

What is claimed is:

1. In an engine having a crankshaft split at an intermediate point therealong with one crankshaft portion continuously rotating and the other crankshaft portion adapted to being rotated or remaining inactive, and at least one engine piston operatively connected to each crankshaft portion; a synchronizing and indexing clutch comprising an input member secured to the inner end of the continuously rotating crankshaft portion; an output member secured to the adjacent inner end of the other crankshaft portion; an annular piston including inner and outer concentric rings slidably mounted on said input member; means for circumferentially retaining said annular piston on said input member for rotation therewith; cooperating cone clutch surfaces formed on adjacent faces of said inner ring and said output member; cooperating sets of tapered indexing teeth formed on adjacent portions of said outer ring and said output member and having a predetermined number of unequally spaced, variable width, matching teeth and spaces formed therearound; and a source of fluid under pressure for selectively urging said annular piston toward said output member and bringing said cone clutch surface on said inner ring into slipping engagement with said cone clutch surface on said output member, thereby causing the speed of said output member to approach the speed of said input member prior to said indexing teeth on said outer ring contacting said indexing teeth on said output member, and then meshing therewith in one predetermined circumferential position when the unequally spaced, variable width matching teeth and spaces on said outer ring and said output member become aligned for actuating said other crankshaft portion in phase with said continuously rotating crankshaft portion, so as to produce a predetermined firing order for said engine.

2. In an engine including a crankshaft split at an intermediate point therealong and having at least one engine piston operably connected to each crankshaft half, a synchronizing and indexing clutch comprising input and output members secured to adjacent end portions of said crankshaft halves, an annular control piston including inner and outer concentric ring members slidably mounted on said input member for rotation therewith, fluid pressure means for slidably moving said inner and outer ring members toward said output member, cooperating cone clutch surfaces formed on said inner ring member and said output member, two sets of ramped indexing teeth formed on said outer ring member and said output member, both sets of teeth having a predetermined pattern of unequally spaced, variable width teeth and spaces such that engagement of said two sets of teeth will occur only at one particular aligned circumferential position in order to interconnect the split crankshaft halves and thereby bring the idle engine pistons into operation in a correct relationship with continuously working engine pistons, said cone clutch surfaces serving to synchronize the speed of said output member with the speed of said input member prior to the engagement of said two sets of teeth, the ramped teeth accommodating automatic separation of said two sets of teeth when the pressure on said annular piston is reduced.

3. In an engine having a crankshaft split at an intermediate point therealong with one crankshaft portion continuously rotating and the other crankshaft portion adapted to being rotated or remaining inactive, and at least one engine piston operatively connected to each crankshaft portion; a synchronizing and indexing clutch comprising an input member secured to the inner end of the continuously rotating crankshaft portion; an output member secured to the inner end of the continuously rotating crankshaft portion; an output member secured to the adjacent inner end of the other crankshaft portion; an annular piston including inner and outer concentric rings slidably mounted on said input member; means for circumferentially retaining said inner and outer rings on said input member for rotation therewith; detent means interconnecting said inner and outer rings; cooperating cone clutch surfaces formed on adjacent faces of said inner ring and said output member; cooperating sets of axially tapered indexing teeth formed on adjacent portions of said outer ring and said output member and having a predetermined number of unequally spaced, variable width, matching tapered teeth and spaces formed therearound; and a source of fluid under pressure for selectively urging said inner and outer rings toward said output member and causing said cone clutch surface on said inner ring to slippingly engage said cone clutch surface on said output member, thereby bringing the speed of said output member up to the speed of said input member, and thereafter overcoming said detent means and continue to move said outer ring forward until said indexing teeth on said outer ring contact said indexing teeth on said output member and engage same in one predetermined circumferential position when the unequally spaced, variable width matching teeth and spaces on said outer ring and said output member become aligned for actuating said other crankshaft portion in phase with said continuously rotating crankshaft portion, so as to produce a predetermined firing order for said engine; said set of tapered teeth on said outer ring being automatically forced out of the path of said set of tapered teeth on said output member to thereby sequentially disengage said sets of teeth and said cone clutch surfaces to separate said crankshaft portions once the pressure on said annular piston is exhausted.

4. In an engine having a crankshaft split at an intermediate point therealong with one crankshaft half continuously rotating and the other crankshaft half adapted to being rotated or remaining inactive, at least one crank throw portion formed on each crankshaft half, and a piston operatively connected to each crank throw portion; a synchronizing and indexing clutch comprising an input member secured to the inner end of the continuously rotating crankshaft half; an output member secured to the adjacent inner end of the other crankshaft half; an annular recess formed on a face of said input member; an annular piston including inner and outer concentric rings slidably mounted in said annular recess; a plurality of spaced holes formed in the bottom of said annular recess; a plurality of spaced pins secured to the inner face of said annular piston and slidably mounted in said plurality of spaced holes; a plurality of radial pockets formed in the outer peripheral surface of said inner ring; a coil spring mounted in each of said pockets; a plurality of conical depressions formed in the inner peripheral surface of said outer ring aligned with said pockets, a ball member urged into each of said depressions by said spring in the adjacent pocket; a first cone clutch surface formed on the outer face of said inner ring; a second cone clutch surface formed on the adjacent face of said output member; a first set of axially tapered indexing teeth formed on the outer face of said outer ring; a second set of tapered indexing teeth formed on the outer peripheral surface of said output member rearward of said second cone clutch surface; a predetermined number of unequally spaced, variable width, matching tapered teeth and spaces formed around said first and second sets of indexing teeth; and a source of fluid under pressure adapted to being selectively communicated to said annular recess for urging said inner and outer rings toward said output member and causing said cone clutch surface on said inner ring to slippingly engage said one cone clutch surface on said output member, thereby bringing the speed of said output member up to the speed of said input member, and thereafter forcing said balls out of said depressions and into said pockets against the force of said springs and causing said axially tapered indexing teeth on said outer ring to contact said axially tapered indexing teeth on said output member, and meshing therewith in one predetermined circumferential position when the unequally spaced, variable width matching teeth and spaces on said outer ring and said output member become aligned, for actuating said other crankshaft half in phase with said continuously rotating crankshaft half so as to produce a predetermined firing order for said engine; said set of tapered teeth on said outer ring being automatically forced out of the path of said set of tapered teeth on said output member to thereby disengage said cone clutch surfaces and separate said crankshaft portions once the pressure on said annular piston is reduced.

* * * * *